US008857838B2

(12) United States Patent
Scolari et al.

(10) Patent No.: US 8,857,838 B2
(45) Date of Patent: Oct. 14, 2014

(54) DUAL DRIVE SYSTEM FOR A NON-MOTORIZED VEHICLE

(71) Applicant: Zike, LLC, Greenville, SC (US)

(72) Inventors: Nathan Scolari, Greenville, SC (US); George Reiter, Taylors, SC (US)

(73) Assignee: Zike, LLC, Greenville, SC (US)

(*) Notice: Subject to any disclaimer, the term of this patent is extended or adjusted under 35 U.S.C. 154(b) by 0 days.

(21) Appl. No.: 13/836,878

(22) Filed: Mar. 15, 2013

(65) Prior Publication Data

US 2014/0265214 A1 Sep. 18, 2014

(51) Int. Cl.
*B60K 17/34* (2006.01)
*B62M 1/26* (2013.01)

(52) U.S. Cl.
CPC ........................................ *B62M 1/26* (2013.01)
USPC ........... 280/233; 280/234; 280/244; 280/247; 280/281.1

(58) Field of Classification Search
USPC ................................... 280/233, 234, 244, 247
See application file for complete search history.

(56) References Cited

U.S. PATENT DOCUMENTS

| 2,510,013 | A | * | 5/1950 | Edgar | 280/234 |
| 5,082,302 | A | | 1/1992 | Nacar | |
| 5,328,195 | A | | 7/1994 | Sommer et al. | |
| 5,385,359 | A | | 1/1995 | Ehrbar | |
| 5,429,379 | A | | 7/1995 | Grigoriev | |
| 5,511,810 | A | * | 4/1996 | Tong | 280/233 |
| 6,032,970 | A | * | 3/2000 | Porter | 280/234 |
| 6,105,985 | A | * | 8/2000 | Cosgrave | 280/248 |
| 6,193,253 | B1 | | 2/2001 | Barnett | |
| 6,572,129 | B1 | | 6/2003 | Bean | |
| 6,688,623 | B1 | * | 2/2004 | Yunaska | 280/233 |
| 7,000,934 | B1 | * | 2/2006 | Capek | 280/234 |
| 2011/0241305 | A1 | | 10/2011 | Pi | |

FOREIGN PATENT DOCUMENTS

EP 1580112 A1 9/2005
GB 2328656 A 3/1999

* cited by examiner

*Primary Examiner* — Joseph M Rocca
*Assistant Examiner* — Marlon Arce
(74) *Attorney, Agent, or Firm* — McNair Law Firm, P.A.; Douglas W. Kim; Seann P. Lahey

(57) ABSTRACT

A dual drive system for a non-motorized vehicle comprising a first drive unit disposed on a vehicle frame, wherein the first drive unit has a rotary action and is operatively associated with a first wheel assembly for turning a wheel; and, a second drive unit disposed on the vehicle frame, wherein the second drive unit has a lever action and is operatively associated with the first wheel assembly for turning the wheel. The first drive unit and the second drive unit are independently operable for turning the wheel.

16 Claims, 8 Drawing Sheets

DUAL DRIVE SYSTEM FOR A NON-MOTORIZED VEHICLE

BACKGROUND OF THE INVENTION

1) Field of the Invention

The present invention relates to drive systems for non-motorized vehicles, and more particularly, to a dual drive system having different motion types for turning a wheel assembly, wherein each drive system can be operated independently to propel the vehicle.

2) Description of Related Art

Some types of bicycles include large pegs extending laterally out from the wheel axles. These pegs are provided for the rider to stand on when performing various trick moves and other riding techniques.

A problem arises in that when the rider is standing on the pegs, the rider does not have any means for propelling the bicycle as the pegs are fixed to the frame of the bicycle and do not interact with the drive system.

Accordingly, it is an object of the present invention to provide a dual drive system for a non-motorized vehicle so the rider has flexibility in propelling the vehicle when performing various tricks and stunts.

It is an object of the present invention to provide a dual drive system for a non-motorized vehicle in which each drive system can be independently operated so the rider can choose a given drive system for a given position on the vehicle.

It is an object of the present invention to provide a non-motorized vehicle having trick pegs on which the rider can stand that are operatively associated with the a drive system of the vehicle so the rider can simultaneously perform tricks and propel the vehicle.

SUMMARY OF THE INVENTION

The above objectives are accomplished according to the present invention by providing a dual drive system for a non-motorized vehicle comprising a first drive unit disposed on a vehicle frame, wherein the first drive unit has a rotary action and is operatively associated with a first wheel assembly for turning a wheel; and, a second drive unit disposed on the vehicle frame, wherein the second drive unit has a lever action and is operatively associated with the first wheel assembly for turning the wheel; wherein the first drive unit and the second drive unit are independently operable for turning the wheel.

In a further advantageous embodiment, the first drive unit includes a first rotary crank arm disposed on a first side of the frame, and a second rotary crank arm dispose on a second side of the frame; wherein the first and second rotary crank arms move in a circular motion and are operatively connected to a primary drive sprocket that is connected to a wheel sprocket of the first wheel assembly by a primary drive chain.

In a further advantageous embodiment, each of the first and second rotary crank arms includes a footrest to facilitate turning of the first and second rotary crank arms.

In a further advantageous embodiment, the second drive unit includes a first lever crank arm having a first distal end pivotally mounted to the first side of the frame, and a second lever crank arm having a first distal end pivotally mounted to the second side of the frame, wherein the first and second lever crank arms move in a generally vertical up and down reciprocating motion.

In a further advantageous embodiment, each of the first and second lever crank arms include a footrest to facilitate movement of the first and second lever crank arms.

In a further advantageous embodiment, the second drive unit includes a first cam unit disposed on the first side of the frame engaging the first lever crank arm, and a second cam unit disposed on the second side of the frame engaging the second lever crank arm, wherein the first and second cam units support the first and second lever crank arms, respectively, and convert the up and down reciprocating motion into a rotary motion.

In a further advantageous embodiment, each of the first and second cam units includes a drive shaft operatively associated with an upper drive sprocket, a cam arm disposed on the drive shaft, and an actuator arm carried by the cam arm, wherein the actuator arm engages one of the first and second lever crank arms so that the up and down reciprocating motion of a given lever crank arm causes rotation of the actuator arm to turn the drive shaft and rotate the upper drive sprocket.

In a further advantageous embodiment, each of the first and second cam units includes a torsion spring operatively associated with the drive shaft for facilitating a rotation of the drive shaft to assist in moving a given lever crank arm upward from a down position.

In a further advantageous embodiment, the second drive unit includes a first upper drive sprocket disposed on the first side of the frame operative associated with the first cam unit, and a second upper drive sprocket disposed on the second side of the frame operative associated with the second cam unit; a first lower drive sprocket disposed on the first side of the frame connected to the first upper drive sprocket by a first lever drive chain, and a second lower drive sprocket disposed on the second side of the frame connected to the second upper drive sprocket by a second lever drive chain, wherein the first and second lower drive sprockets are operatively associated with the primary drive sprocket so that rotation of one of the first and second lower drive sprockets turns the primary drive sprocket.

In a further advantageous embodiment, the first lever crank arm reciprocates up and down independent of the motion of the second lever crank arm.

In a further advantageous embodiment, the first lever crank arm extends laterally adjacent the first wheel assembly on the first side of the frame, and the second lever crank arm extends laterally adjacent the first wheel assembly on a second side of the frame, and wherein a resting platform is disposed directly above the first wheel assembly generally between the first and second lever crank arms for supporting a user when operating the second drive unit.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Figure 1:
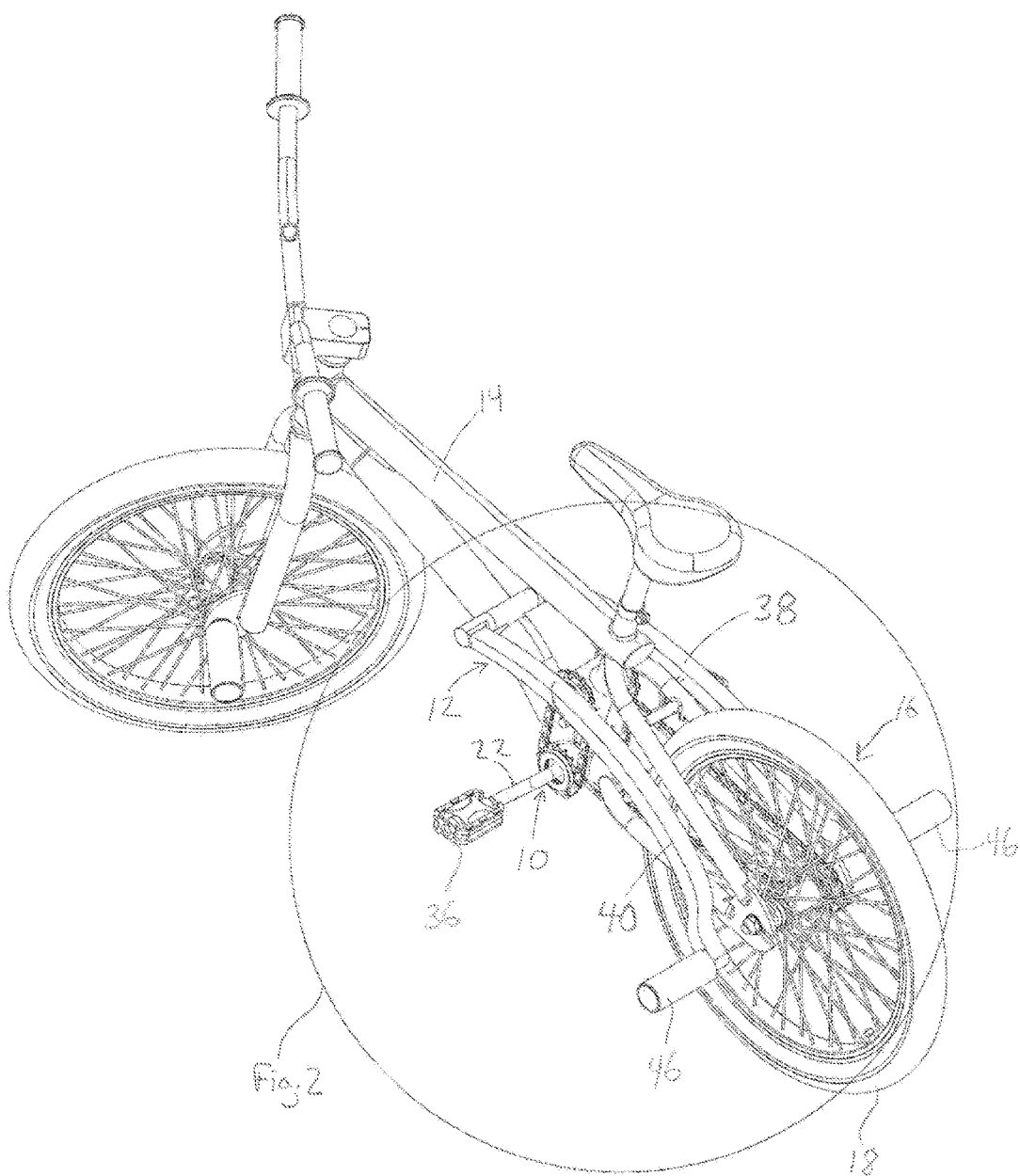
FIG. 1 shows a top perspective view of a non-motorized vehicle having a dual drive system according to the present invention.
Figure 2:
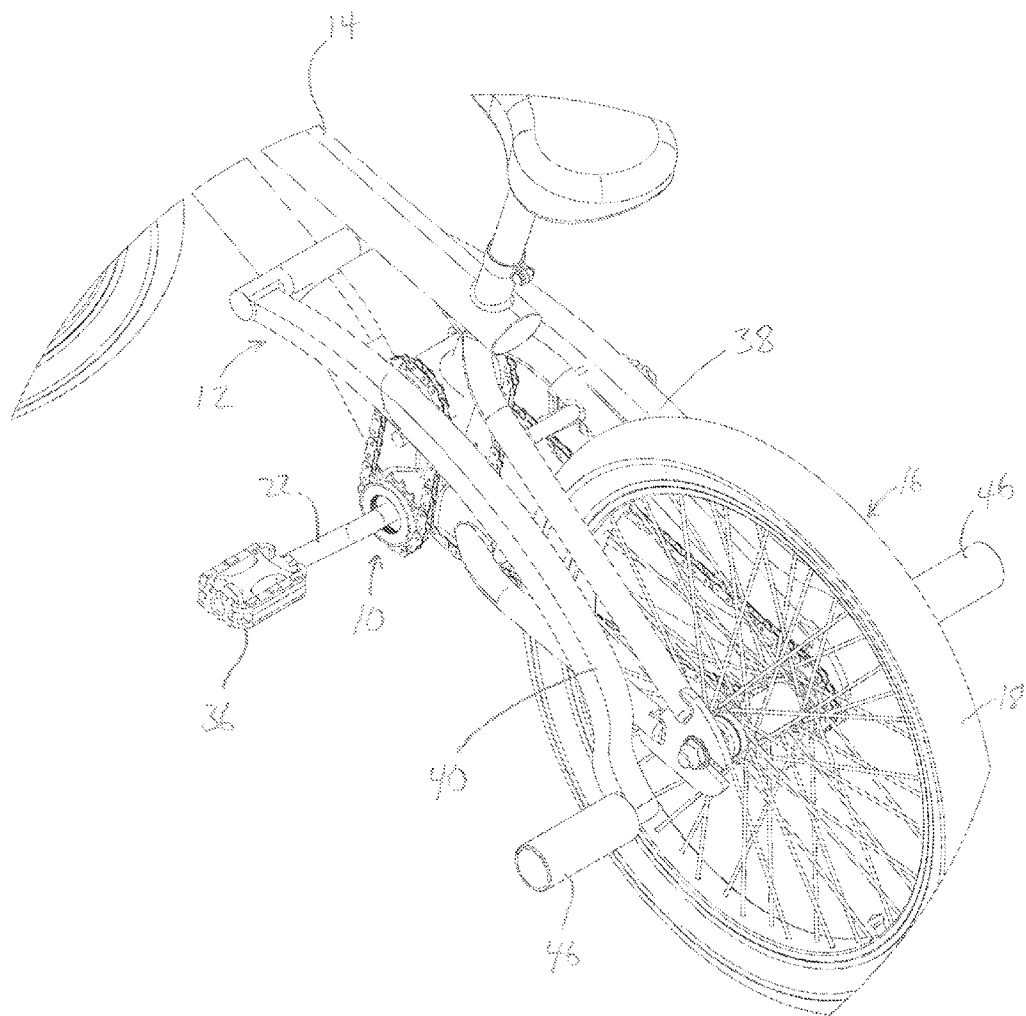
FIG. 2 shows a detailed perspective view of the section indicated in FIG. 1.

With reference to the drawings, the invention will now be described in more detail. Referring to FIGS. 1 and 2, a dual drive system for a non-motorized vehicle is shown. In the illustrated embodiment, the non-motorized vehicle is a standard form bicycle. The dual drive system includes a first drive unit, designated generally as 10, is disposed on a vehicle frame 14. First drive unit 10 has a rotary action and is operatively associated with a first wheel assembly 16 for turning a wheel 18. A second drive unit, designated generally as 12, is disposed on vehicle frame 14. Second drive unit 12 has a lever action and is operatively associated with first wheel assembly 16 for turning wheel 18. First drive unit 10 and second drive unit 12 are independently operable for turning wheel 18 so a rider can choose a given drive system 10, 12 depending on how they are positioned riding the bike.

Figure 5:
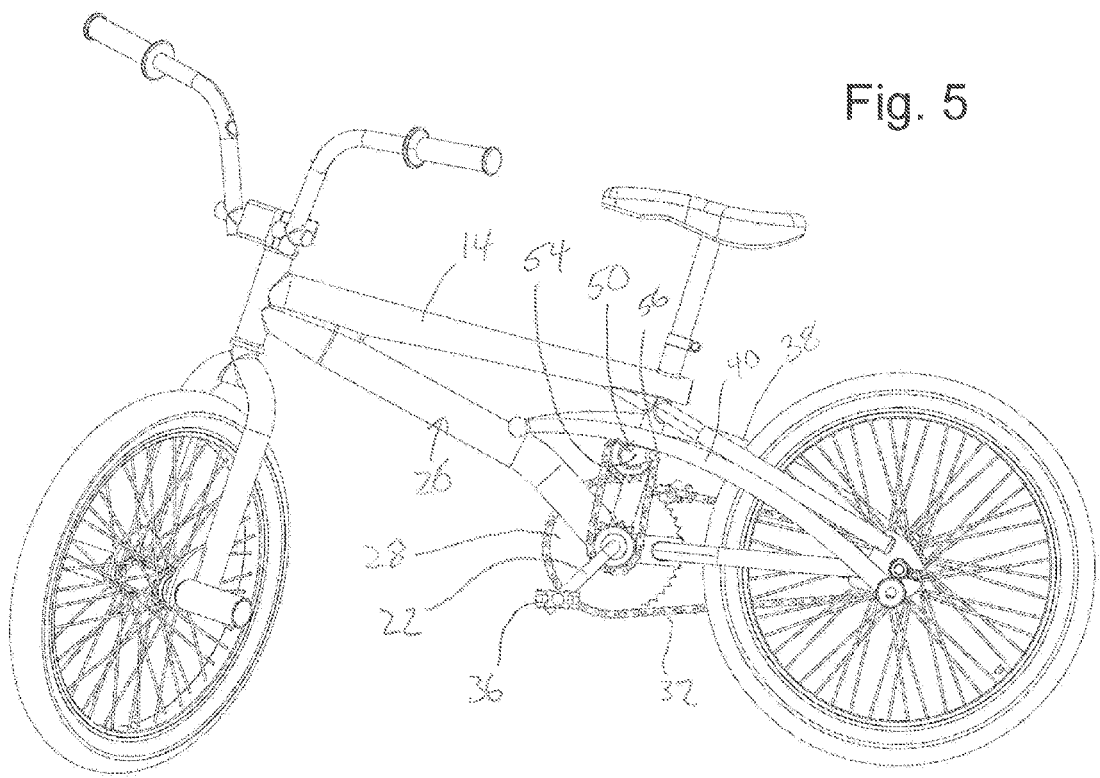
FIG. 5 shows a left side view of the non-motorized vehicle having a dual drive system according to the present invention.
Figure 6:
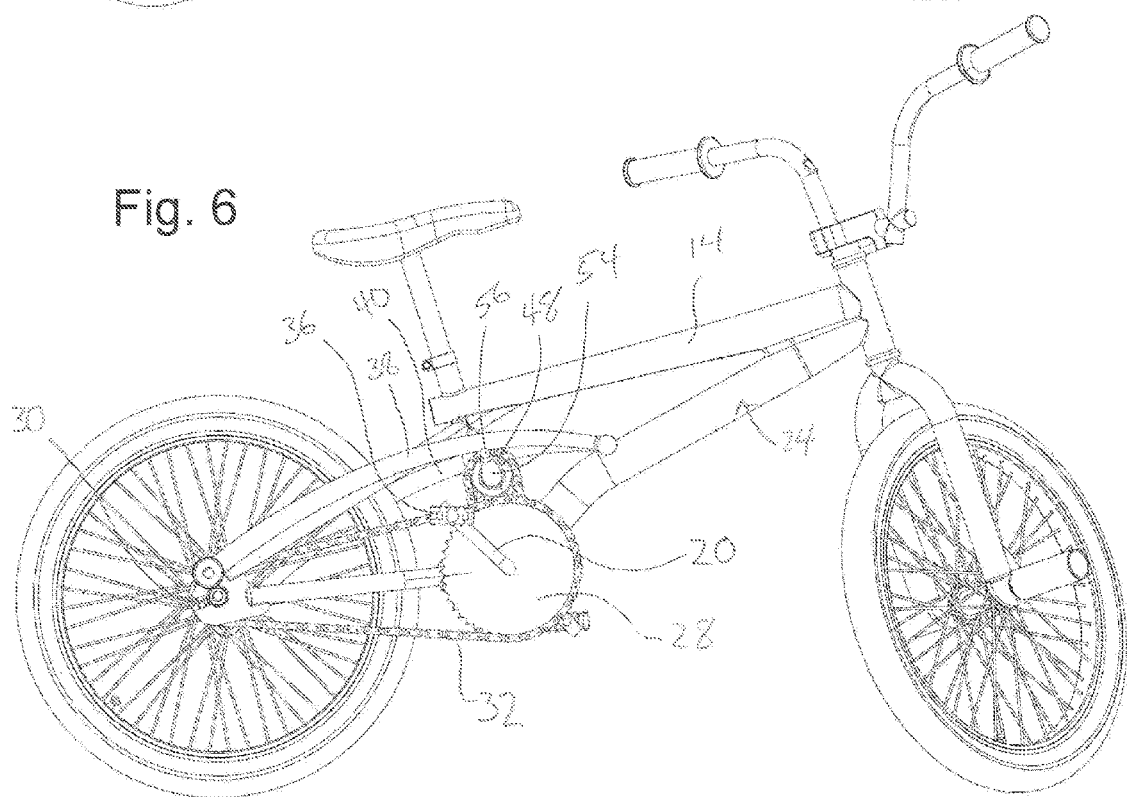
FIG. 6 shows a right side view of the non-motorized vehicle having a dual drive system according to the present invention.

In the illustrated embodiment, first drive unit 10 can be a typical rotary type crank assembly common to bicycles of this type. Referring to FIGS. 5 and 6, first drive unit 10 includes a first rotary crank arm 20 disposed on a first side 24 of frame 14, and a second rotary crank arm 22 dispose on a second side 26 of frame 14. First and second rotary crank arms 20, 22 move in a circular motion to define the rotary action of first drive unit 10. First and second rotary crank arms 20, 22 are operatively connected to a primary drive sprocket 28. Primary drive sprocket 28 in turn is connected to a wheel sprocket 30 of first wheel assembly 16 by way of a primary drive chain 32. Primary drive chain 32 is a link type chain, but can be any suitable type of connecting means such as a belt, cable, or strap. Further, a drive shaft can be operatively associated with first drive unit 10 using gears to transfer rotational movement of first and second rotary crank arms 20, 22 to rear wheel assembly 16 may also be employed.

Figure 3:
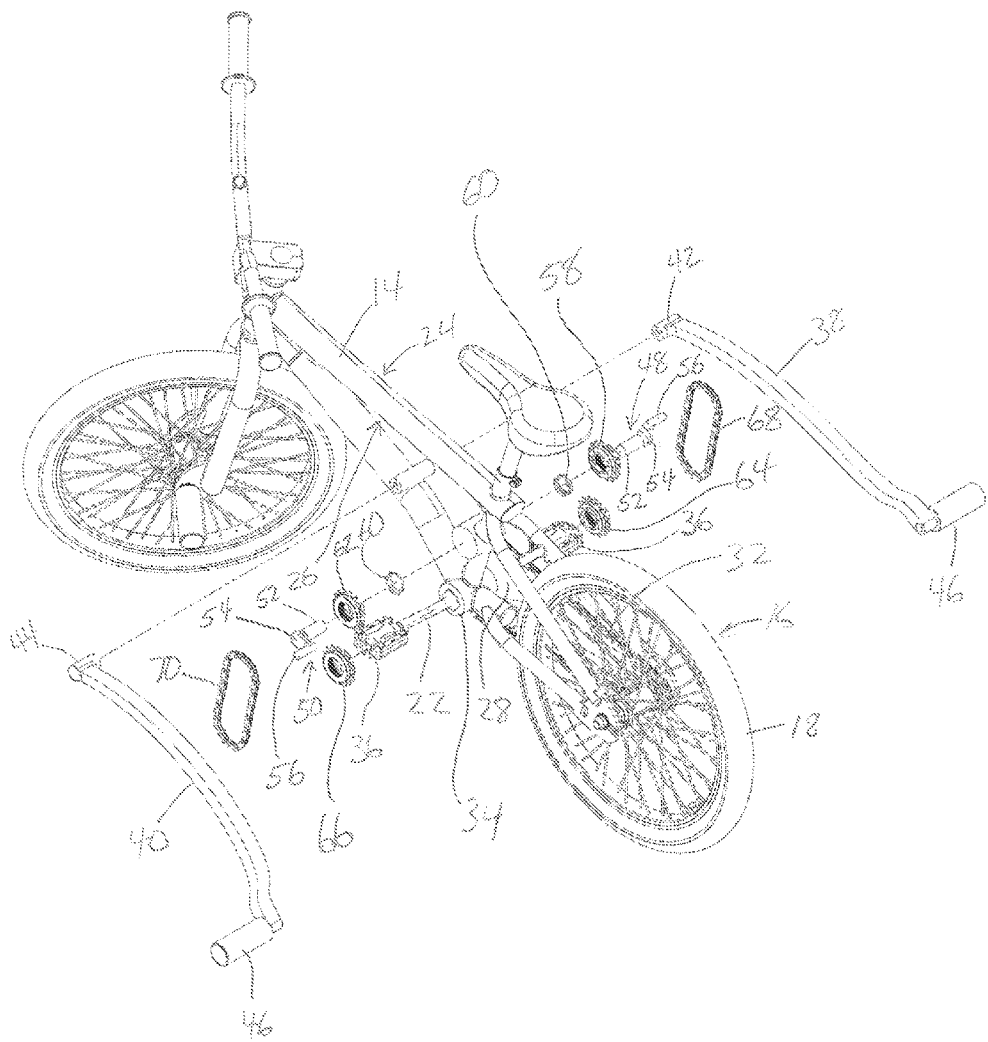
FIG. 3 shows an exploded top perspective view of FIG. 1.
Figure 7:
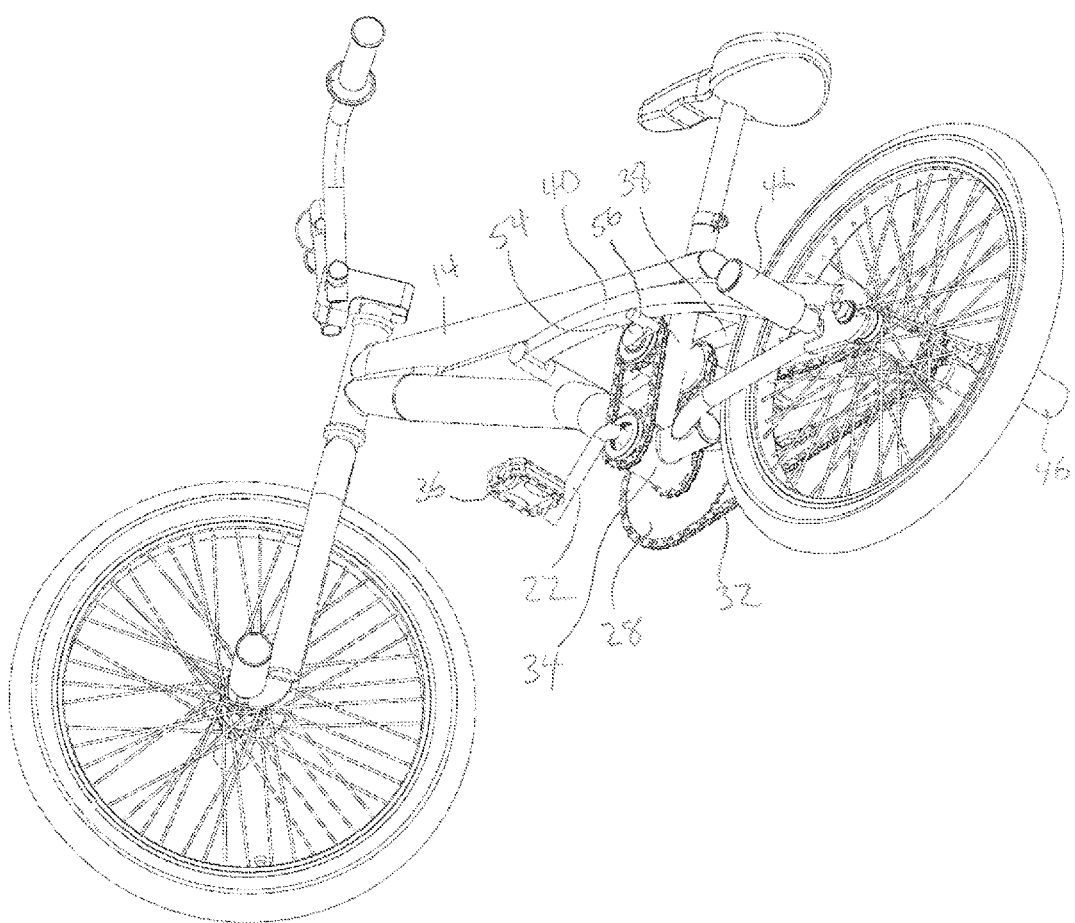
FIG. 7 shows a bottom perspective view of the non-motorized vehicle having a dual drive system according to the present invention.

Referring to FIGS. 3 and 7, preferably, first drive unit 10 includes a crank hub 34, which is preferably a one way clutch type hub, carrying each of rotary crank arms 20, 22 to allow for free spinning when rotary crank arms 20, 22 are not being turned. In the illustrated embodiment, primary drive sprocket 28 is carried by crank hub 34. Optionally, primary drive sprocket 28 may be mounted to a distal end of rotary crank arm 20 where rotary crank arm 20 engages crank hub 34, as commonly known in the art.

Figure 4:
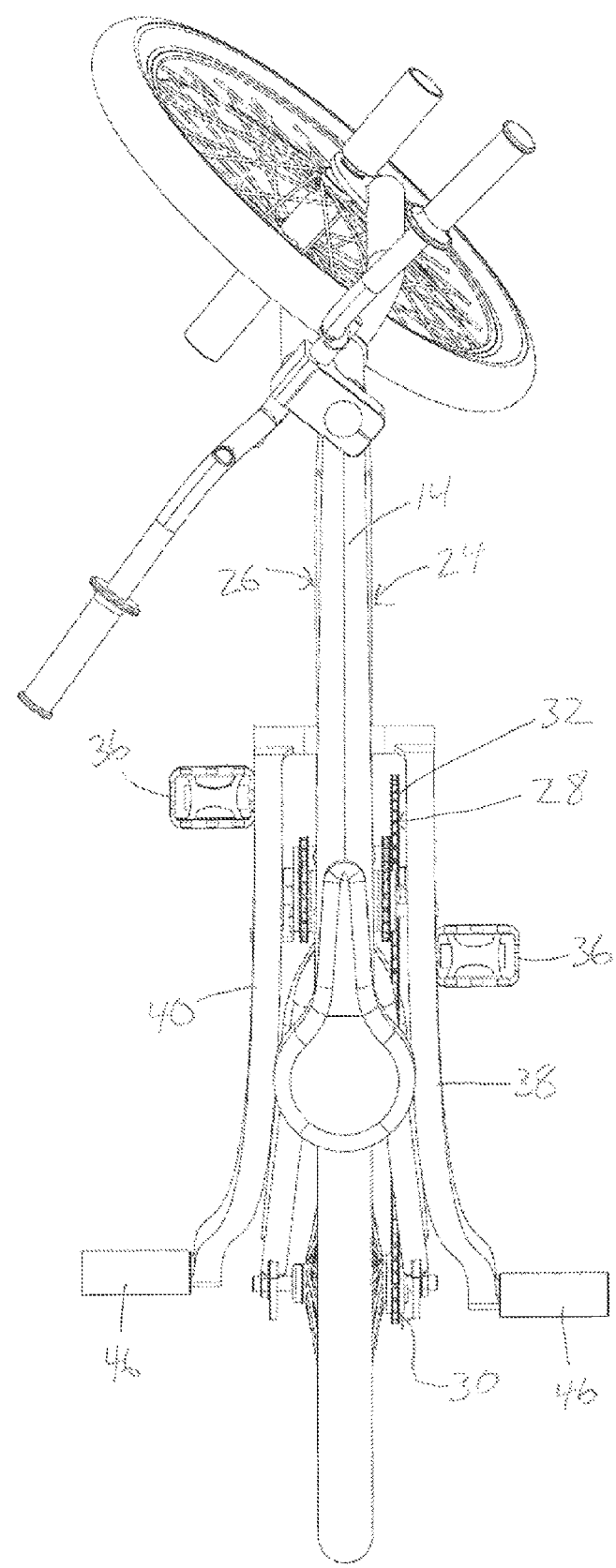
FIG. 4 shows a top view of the non-motorized vehicle having a dual drive system according to the present invention.

Referring to FIGS. 4-6, in the illustrated embodiment, each of the first and second rotary crank arms 20, 22 includes a footrest 36 to facilitate turning of the first and second rotary crank arms 20, 22. Each footrest 36 is pivotally carried at a distal end of first and second rotary crank arms 20, 22 to facilitate turning of the rotary crank arms.

Referring to FIGS. 3 and 4, in the illustrated embodiment, second drive unit 12 includes a first lever crank arm 38 having a first distal end 42 pivotally mounted to first side 24 of frame 14, and a second lever crank arm 40 having a first distal end 44 pivotally mounted to second side 26 of frame 14. Whereas first drive unit 12 has a rotary motion, first and second lever crank arms 38, 40 move in a generally vertical up and down reciprocating motion that define the lever action of second drive unit 12.

In the illustrated embodiment, each of first and second lever crank arms 38, 40 include a footrest 46 to facilitate the up and down movement of first and second lever crank arms 38, 40. Preferably, each of footrests 46 is a rounded peg type footrest that is useful for trick riding. However, footrest 46 may be any of various types of footrests including the standard pedal type shown attached to rotary crank arms 20, 22, which may be pivotally mounted or stationary, or may be a platform extending along the length of each said first and second lever crank arms 38, 40.

Referring to FIG. 3, second drive unit 12 includes a first cam unit, designated generally as 48, is disposed on first side 24 of frame 14. First cam unit 48 is arranged to engage first lever crank arm 38. A second cam unit, designated generally as 50, is disposed on second side 26 of frame 14. Second cam unit 50 is arranged to engage second lever crank arm 40. Referring to FIGS. 5 and 6, first and second cam units 48 and 50 support first and second lever crank arms 38, 40, respectively, and convert the up and down reciprocating motion of the lever crank arms into a rotary motion to ultimately turn primary drive sprocket 28.

Each of first and second cam units 48 and 50 includes a drive shaft 52, a cam arm 54 disposed on drive shaft 52, and an actuator arm 56 carried by cam arm 54. Drive shaft 52 is operatively associated with an upper drive sprocket 58. Actuator arm 56 of each cam unit 48, 50 engages first and second lever crank arms 38, 40, respectively, so that the up and down reciprocating motion of a given lever crank arm 38, 40 causes rotation of actuator arm 56 to turn drive shaft 52 and rotate upper drive sprocket 58.

Referring to FIGS. 5-7, a downward force on lever crank arms 38, 40 causes actuator arm 56 on each cam unit 48, 50 to slide along an underside of lever crank arms 38, 40. FIG. 6 shows actuator arm 56 in an up position before a downward stroke of lever crank arm 38. FIG. 5 shows actuator arm 56 moved downward resulting from a downward force from lever crank arm 40, which causes actuator arm 56 to slide on the underside of the lever crank arm. Cam arm 54 translates the downward movement of actuator arm 56 into a rotation of drive shaft 52 for turning upper drive sprocket 58.

Referring to FIG. 3, in a preferred embodiment, each of first and second cam units 48, 50 include a torsion spring 60 operatively associated with drive shaft 52 for facilitating a rotation of drive shaft 52 to assist in moving a given lever crank arm 38, 40 upward from a down position. Thus, the spring force applied to drive shaft 52 rotates cam arm 54 and causes actuator arm 56 to move upward, forcing lever crank arm 38, 40 upward for the next downward stroke.

Referring to FIG. 3, in the illustrated embodiment, second drive unit 12 includes first upper drive sprocket 58 disposed on first side 24 of frame 14 operative associated with first cam unit 48 as detailed above. A second upper drive sprocket 62 is disposed on second side 26 of frame 14 generally opposite first upper drive sprocket 58 and is operative associated with second cam unit 50. A first lower drive sprocket 64 is disposed on first side 24 of frame 14 and connected to first upper drive sprocket 58 by a first lever drive chain 68. A second lower drive sprocket 66 is disposed on second side 26 of frame 14 generally opposite first lower drive sprocket 64 and is connected to second upper drive sprocket 62 by a second lever drive chain 70. First and second lower drive sprockets 64, 66 are operatively associated with primary drive sprocket 28 so that rotation of one of first and second lower drive sprockets 64, 66 turns primary drive sprocket 28.

In the illustrated embodiment, first and second lower drive sprockets 64, 66 are carried by crank hub 34 and integrally connected therewith so that rotation of first and second lower drive sprockets 64, 66 causes rotation of primary drive sprocket 28. Further, in a preferred embodiment, upper drive sprockets 58, 62 and lower drive sprockets 64, 66 are one way clutch sprockets able to free spin when not being rotated by drive shaft 52. Accordingly, lever crank arms 38, 40 do not move up and down unless being operated by the rider. Additionally, the illustrated arrangement with one way clutch sprockets allows first lever crank arm 38 to reciprocate up and down independent of the motion of second lever crank arm 40.

Figure 8:
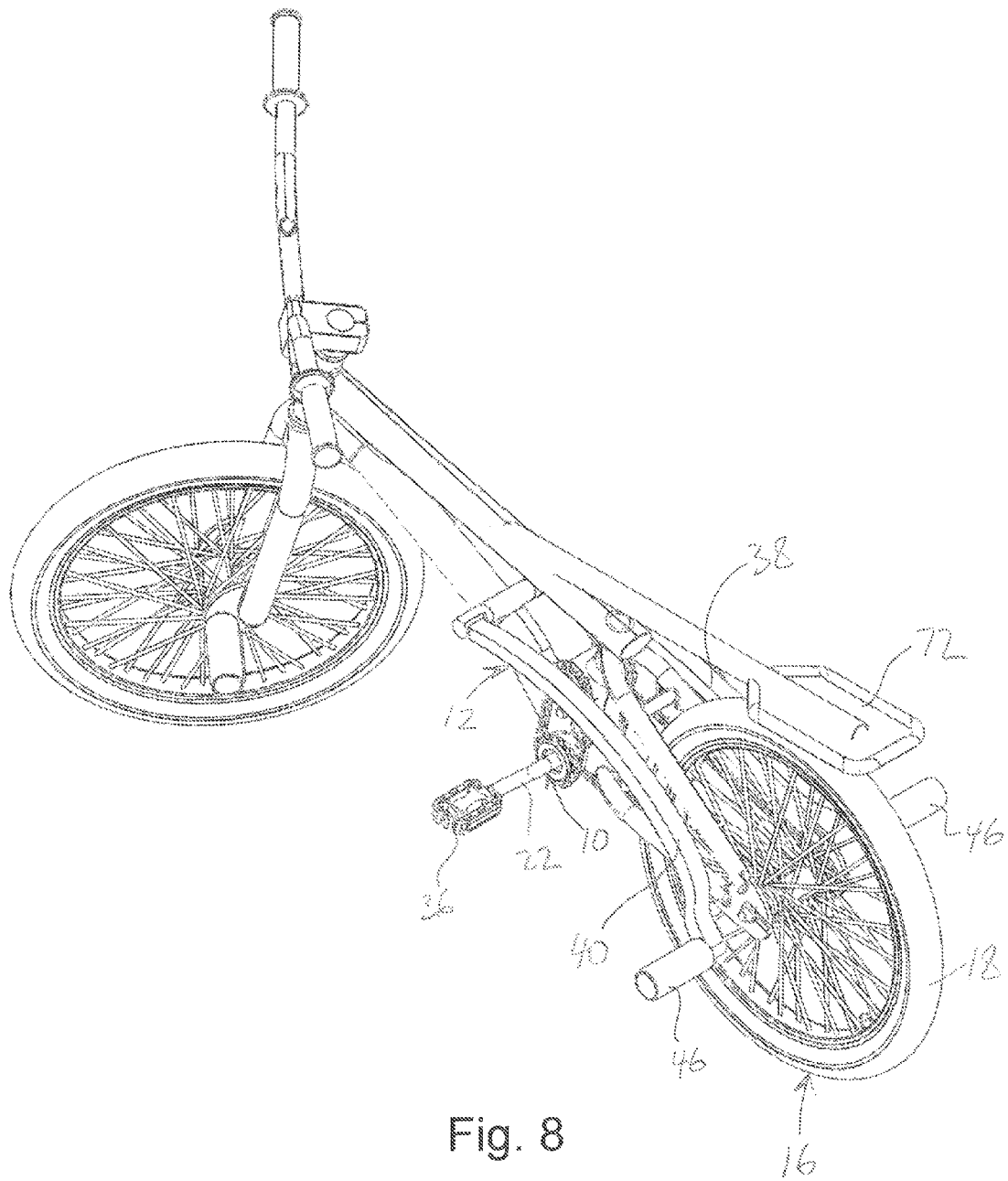
FIG. 8 shows a top perspective view of an alternative embodiment of the non-motorized vehicle having a dual drive system according to the present invention; and, FIG. 9 shows a top perspective view of an alternative embodiment of the second drive unit according to the present invention.

Referring to FIG. 4, in the illustrated embodiment, first lever crank arm 38 extends laterally adjacent first wheel assembly 16 on first side 24 of frame 14, and second lever crank arm 40 extends laterally adjacent first wheel assembly 16 on second side 26 of frame 14. This allows the rider to easily lift the front wheel for tricks, which still being able to move lever crank arms 38, 40 to propel the bicycle. Referring to FIG. 8, in a further embodiment, a resting platform 72 is disposed directly above first wheel assembly 16 generally between the first and second lever crank arms 38, 40 for supporting a user when operating second drive unit 12. In this embodiment, the rider may stand on the platform when doing tricks and the like instead of using a traditional seat, while having easy reach to the footrests 46 to continue propelling the bicycle.

Figure 9:
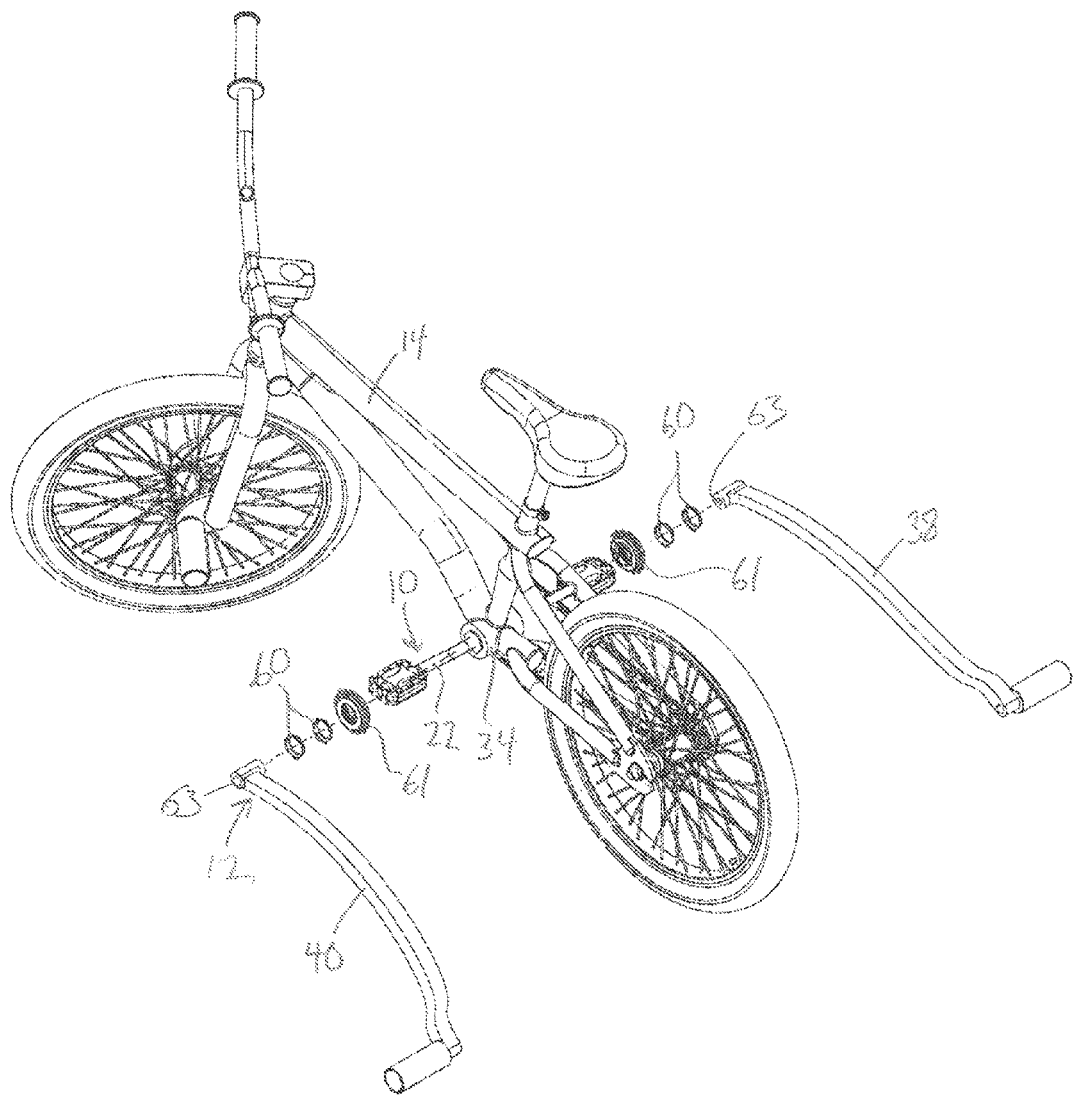

Referring to FIG. 9, in an alternative arrangement, second drive unit 12 is disposed on crank hub 34 with first drive unit 10. In this embodiment, first and second lever crank arms 38, 40 are mounted to crank hub 34 so that rotary crank arms 20, 22 extend through an opening 63 in distal ends 42, 44 of first and second lever crank arms 38, 40. Torsion springs 60 are provided to bias each of first and second lever crank arms 38, 40 upward. As before, each of first and second lever crank arms 38, 40 are carried on crank hub 34 by a one way clutch bearing members 61. Accordingly, this allows for a free spin rotation when moving upward, but engages distal ends 42, 42 of lever crank arms 38, 40 when moving downward to cause the connected elements of crank hub 34 to rotate primary drive sprocket 28.

While a preferred embodiment of the invention has been described using specific terms, such description is for illustrative purposes only, and it is to be understood that changes and variations may be made without departing from the spirit or scope of the following claims.

What is claimed is:

1. A dual drive system for a non-motorized vehicle, said drive system comprising:
   a first drive unit disposed on a vehicle frame, wherein said first drive unit has a rotary action and is operatively associated with a first wheel assembly for turning a wheel;
   a second drive unit disposed on said vehicle frame, wherein said second drive unit has a lever action and is operatively associated with said first wheel assembly for turning said wheel;
   wherein said first drive unit and said second drive unit are independently operable for turning said wheel;
   a first rotary crank arm disposed on a first side of said frame, and a second rotary crank arm disposed on a second side of said frame;
   wherein said first and second rotary crank arms move in a circular motion and are operatively connected to a primary drive sprocket that is connected to a wheel sprocket of said first wheel assembly by a primary drive chain; and,
   wherein said second drive unit includes a first lever crank arm having a first distal end pivotally mounted to said first side of said frame, and a second lever crank arm having a first distal end pivotally mounted to said second side of said frame, wherein said first and second lever crank arms move in a generally vertical up and down reciprocating motion and each of said first and second lever crank arms includes a footrest to facilitate movement of said first and second lever crank arms.

2. The drive system of claim 1 wherein each of said first and second rotary crank arms includes a footrest to facilitate turning of said first and second rotary crank arms.

3. The drive system of claim 1 wherein said second drive unit includes a first cam unit disposed on said first side of said frame engaging said first lever crank arm, and a second cam unit disposed on said second side of said frame engaging said second lever crank arm, wherein said first and second cam units support said first and second lever crank arms, respectively, and convert said up and down reciprocating motion into a rotary motion.

4. The drive system of claim 3 wherein each of said first and second cam units includes a drive shaft operatively associated with an upper drive sprocket, a cam arm disposed on said drive shaft, and an actuator arm carried by said cam arm, wherein said actuator arm engages one of said first and second lever crank arms so that said up and down reciprocating motion of a given lever crank arm causes rotation of said actuator arm to turn said drive shaft and rotate said upper drive sprocket.

5. The drive system of claim 4 wherein each of said first and second cam units includes a torsion spring operatively associated with said drive shaft for facilitating a rotation of said drive shaft to assist in moving a given said lever crank arm upward from a down position.

6. The drive system of claim 4 wherein said second drive unit includes a first upper drive sprocket disposed on said first side of said frame operatively associated with said first cam unit, and a second upper drive sprocket disposed on said second side of said frame operative associated with said second cam unit;
a first lower drive sprocket disposed on said first side of said frame connected to said first upper drive sprocket by a first lever drive chain, and a second lower drive sprocket disposed on said second side of said frame connected to said second upper drive sprocket by a second lever drive chain,
wherein said first and second lower drive sprockets are operatively associated with said primary drive sprocket so that rotation of one of said first and second lower drive sprockets turns said primary drive sprocket.

7. The drive system of claim 6 wherein said first lever crank arm reciprocates up and down independent of the motion of said second lever crank arm.

8. The drive system of claim 6 wherein said first lever crank arm extends laterally adjacent said first wheel assembly on said first side of said frame, and said second lever crank arm extends laterally adjacent to said first wheel assembly on a second side of said frame, and wherein a resting platform is disposed directly above said first wheel assembly generally between said first and second lever crank arms for supporting a user when operating said second drive unit.

9. A dual drive system for a non-motorized vehicle, said drive system comprising:
a vehicle frame;
a first drive unit mounted to said frame, said first drive unit including a first crank arm that moves in a circular motion;
a second drive unit mounted to said frame, said second drive unit including a second crank arm that moves in a reciprocating up and down motion;
a primary drive sprocket operatively connected to said first and second drive units for rotating said primary drive sprocket to turn a primary drive chain operatively associated with a first wheel assembly for turning a wheel;
wherein said first drive unit and said second drive unit are independently operable for rotating said primary drive sprocket; and,
wherein said second drive unit includes a cam unit disposed on said frame engaging said second crank arm, wherein said cam unit supports said second crank arm and converts said reciprocating up and down motion into a rotary motion.

10. The drive system of claim 9 wherein said cam unit includes a drive shaft operatively associated with an upper drive sprocket, a cam arm disposed on said drive shaft, and an actuator arm carried by said cam arm, wherein said actuator arm engages said second crank arm so that said reciprocating up and down motion causes rotation of said actuator arm to turn said drive shaft and rotate said upper drive sprocket.

11. The drive system of claim 10 wherein said second drive unit includes a lower drive sprocket connected to said upper drive sprocket by a lever drive chain, wherein said lower drive sprocket is operatively associated with said primary drive sprocket so that rotation of said lower drive sprocket turns said primary drive sprocket.

12. The drive system of claim 11 wherein said cam unit includes a torsion spring operatively associated with said drive shaft for facilitating a rotation of said drive shaft to assist in moving said second crank arm upward from a down position.

13. A dual drive system for a non-motorized vehicle, said drive system comprising:
a first drive unit disposed on a vehicle frame, wherein said first drive unit has a rotary action;
a second drive unit disposed on said vehicle frame, wherein said second drive unit has a lever action;
said second drive unit including:
a lever crank arm that moves in a reciprocating up and down motion;
a cam unit operatively associated with said lever crank arm for converting said reciprocating up and down motion into a rotary motion;
an upper drive sprocket operatively associated with said cam unit so that rotation of said cam unit causes rotation of said upper drive sprocket; and,
a lower drive sprocket operatively associated with said upper drive sprocket so that rotation of said upper drive sprocket causes rotation of said lower drive sprocket;
a primary drive sprocket rotatably carried on said frame and operatively connected to said first drive unit and said lower drive sprocket of said second drive unit;
wherein said first drive unit and said second drive unit are independently operable for rotating said primary drive sprocket to turn a primary drive chain operatively associated with a first wheel assembly for turning a wheel.

14. The drive system of claim 13 wherein said cam unit includes a drive shaft operatively associated with said upper drive sprocket, a cam arm disposed on said drive shaft, and an actuator arm carried by said cam arm, wherein said actuator arm engages said second crank arm so that said reciprocating up and down motion causes rotation of said actuator arm to turn said drive shaft and rotate said upper drive sprocket.

15. The drive system of claim 14 wherein said cam unit includes a torsion spring operatively associated with said drive shaft for facilitating a rotation of said drive shaft to assist in moving said second crank arm upward from a down position.

16. The drive system of claim 13 wherein said first drive unit includes a rotary crank arm moving in a circular motion and is operatively connected to said primary drive sprocket for rotating said primary drive sprocket.

* * * * *